United States Patent [19]

Knothe et al.

[11] Patent Number: 4,798,250

[45] Date of Patent: Jan. 17, 1989

[54] BALANCE WITH WIND GUARD

[75] Inventors: Erich Knothe, Eddigehausen; Franz-Josef Melcher, Hardegsen; Günther Maaz, Uslar; Klaus Dardat, Dransfeld; Walter Södler, Göttingen, all of Fed. Rep. of Germany

[73] Assignee: Sartorius GmbH, Fed. Rep. of Germany

[21] Appl. No.: 132,187

[22] Filed: Dec. 14, 1987

[30] Foreign Application Priority Data

Dec. 16, 1986 [DE] Fed. Rep. of Germany ....... 3642842

[51] Int. Cl.$^4$ ...................... G01G 23/18; G01G 21/28
[52] U.S. Cl. .................................. 177/181; 177/238
[58] Field of Search ............................... 177/180–182, 177/238

[56] References Cited

U.S. PATENT DOCUMENTS 2,732,199  1/1956  Meinig .............................. 177/181
3,027,958  4/1962  Gabloffsky ...................... 177/180 X
4,762,190  8/1988  Meixner ........................... 177/181

Primary Examiner—George H. Miller, Jr.
Attorney, Agent, or Firm—Eric P. Schellin

[57] ABSTRACT

A wind guard for a balance is suggested which consists of at least two cylindrically curved wall elements, in which each wall element is connected to a corresponding segment of the circular covering surface. In this manner, the balance scale is readily accessible both from the side and also from above when the wind guard is open.

8 Claims, 4 Drawing Sheets

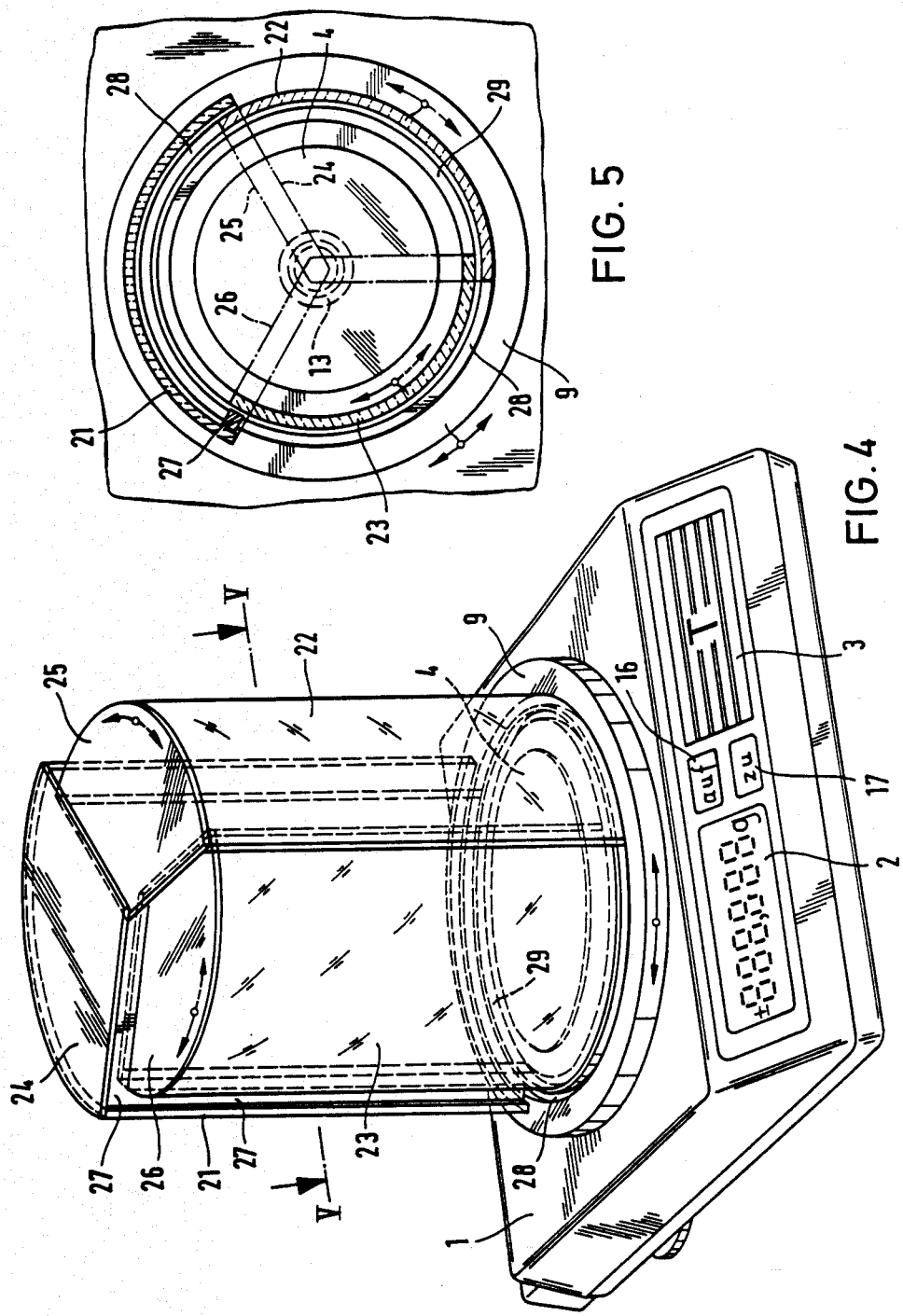

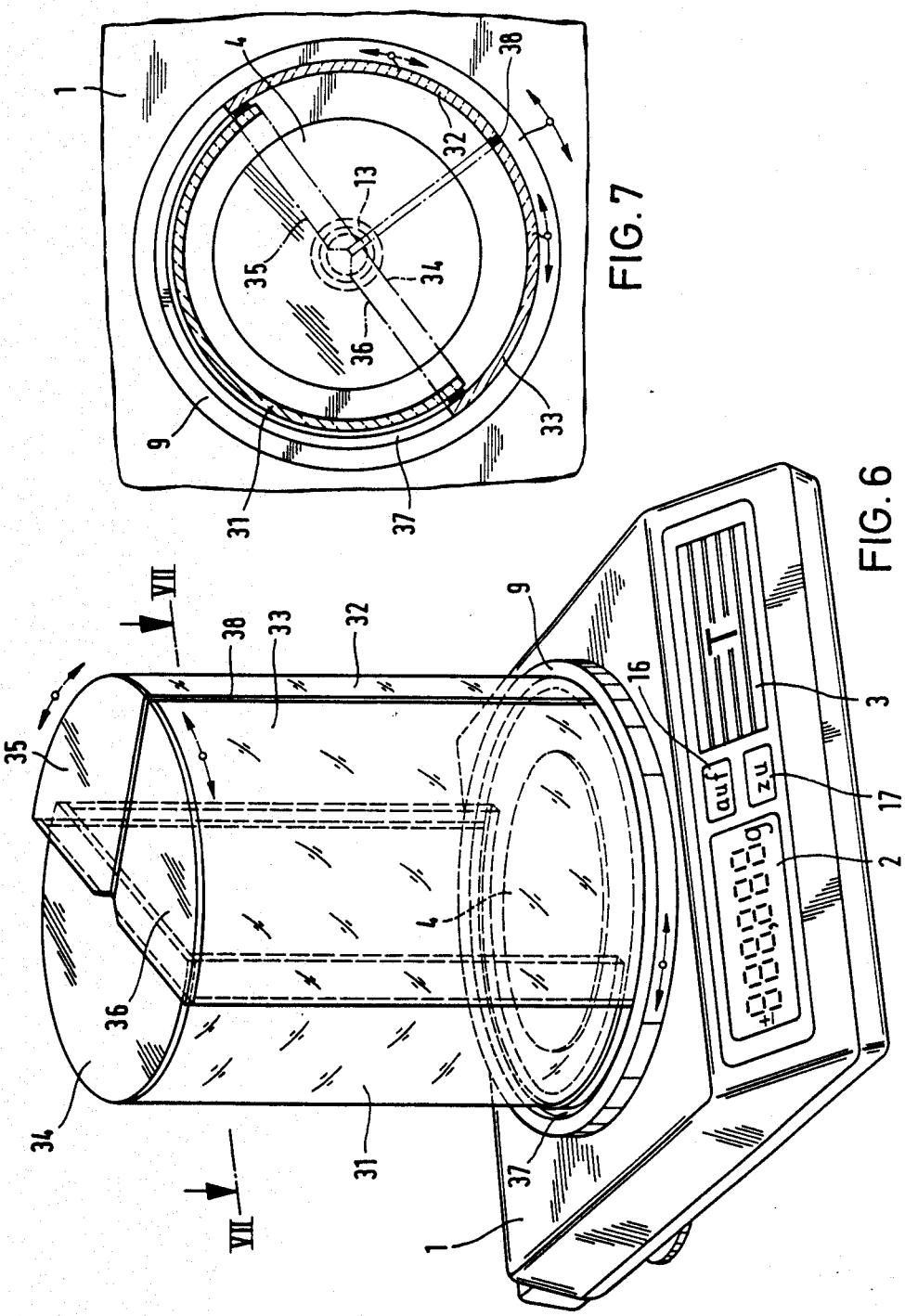

BALANCE WITH WIND GUARD

BACKGROUND OF THE INVENTION

The invention relates to a balance with a wind guard which comprises at least two cylindrically curved wall elements which can be shifted toward each other for opening and closing.

Balances of this type are known, for example, from DE-AS No. 11 78 618, from brochures of the Sartorius company about their "Selecta" balance and from brochures of the Mettler company about their "UM3" balance.

A disadvantage of these known balances with a wind guard is the fact that the weighing area is only accessible from the side when the wall elements are open.

One of the objects of the invention is to disclose a wind guard for balances of the type initially cited which renders the weighing area accessible from the side and from above without generating additional troublesome turbulence in the weighing area.

The invention achieves such object by connecting each wall element to a corresponding segment of the circular covering surface. As a result of this measure, when the wall element is opened, the top of the cylindrical wind guard automatically opens with it and frees a wide, uninterrupted opening which permits loading both from the side and from above as well as loading obliquely from above.

Wall and covering surfaces move past each other like scissors, so that the smallest possible pressure changes and turbulence are generated in the weighing area during actuation.

SUMMARY OF THE INVENTION

In a first advantageous embodiment the wind guard consists of two cylindrically curved wall elements, each of which surrounds somewhat more than one half of a cylinder circumference and somewhat more than half of the circular covering surface is connected to each wall element.

In a second advantageous embodiment the wind guard consists of three cylindrically curved wall elements, each of which surrounds somewhat more than a third of a cylinder circumference and somewhat more than a third of the circular covering surface is connected to each wall element.

In a third advantageous embodiment the wind guard consists of three cylindrically curved wall elements, whereby one wall element surrounds somewhat more than one half of a cylinder circumference and each of the two other wall elements surrounds somewhat more than a fourth of a cylinder circumference and somewhat more than one half of the circular covering surface is connected to the first wall element and somewhat more than a fourth of the circular covering surface is connected to each of the two other wall elements.

In a particularly convenient design at least one of the wall elements is shifted by an electromotor. In this manner the opening and the closing of the wind guard can also be initiated e.g. by a foot switch and the operator has both hands free for loading the balance; or, the guard can be opened and closed during loading by a robot by means of a command from a control computer and the robot does not have to open and close the wind guard with its hand.

In order to be able to rotate the loading opening of the wind guard in any direction desired, it is advantageous if, in addition, all wall elements can be rotated in common by hand.

It is advantageous to use glass or metal as material for the wall elements, whereby one wall element can also consist of glass and the other wall element(s) can consist of metal.

BRIEF DESCRIPTION OF THE INVENTION

The invention is described below with reference made to the schematic drawings.

FIG. 4 shows a perspective view of the balance with wind guard in a second embodiment.

FIG. 5 shows a horizontal section through the wind guard of FIG. 4.

FIG. 6 shows a perspective view of the balance with wind guard in a third embodiment.

FIG. 7 shows a horizontal section through the wind guard of FIG. 6.

Figure 1:
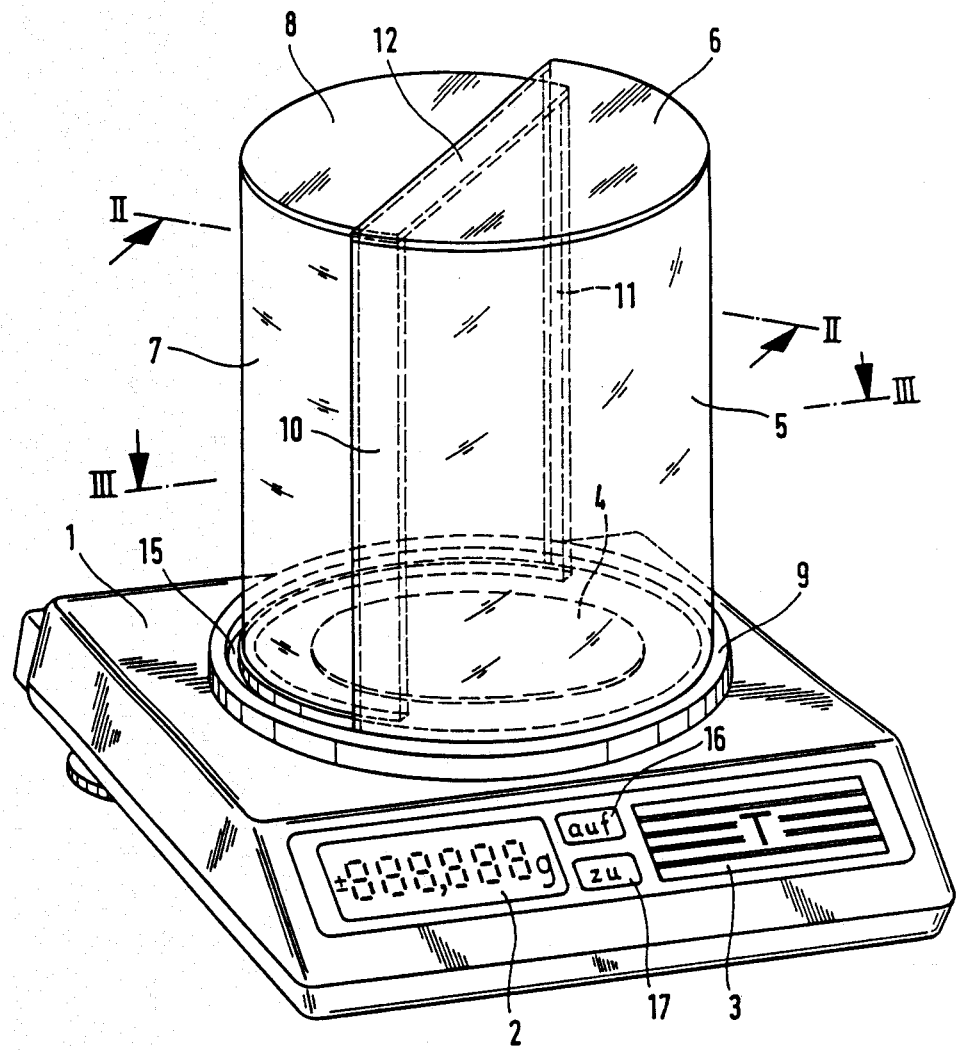
FIG. 1 shows a perspective view of the balance with wind guard in a first embodiment.

balance shown in FIG. 1 comprises a housing 1 on the top of which balance scale 4 is located and also comprises a display 2 and a tare key 3. A wind guard is present for protecting the balance scale 4 and the weighing material located thereon which wind guard consists of two cylindrically curved wall elements 5, 7. Each wall element surrounds somewhat more than one half of the cylinder jacket and the curvature of wall element 5 is somewhat less than the curvature of wall element 7, so that the two wall elements overlap one another at areas 10, 11 and are sealed against one another by sealing elements which are not shown. A corresponding segment 6 of the circular covering surface is connected to wall element 5; likewise, a corresponding segment 8 of the circular covering surface is connected to wall element 7. Both segments include somewhat more than one half of a circle; moreover, segment 6 is positioned somewhat higher so that the two segments 6, 8 overlap one another at area 12 and are sealed by sealing elements which can not be seen. Thus, in the closed position of the wind guard shown, the weighing area with balance scale 4 is protected on all sides against being affected from the outside by drafts of air, etc.

Figure 2:
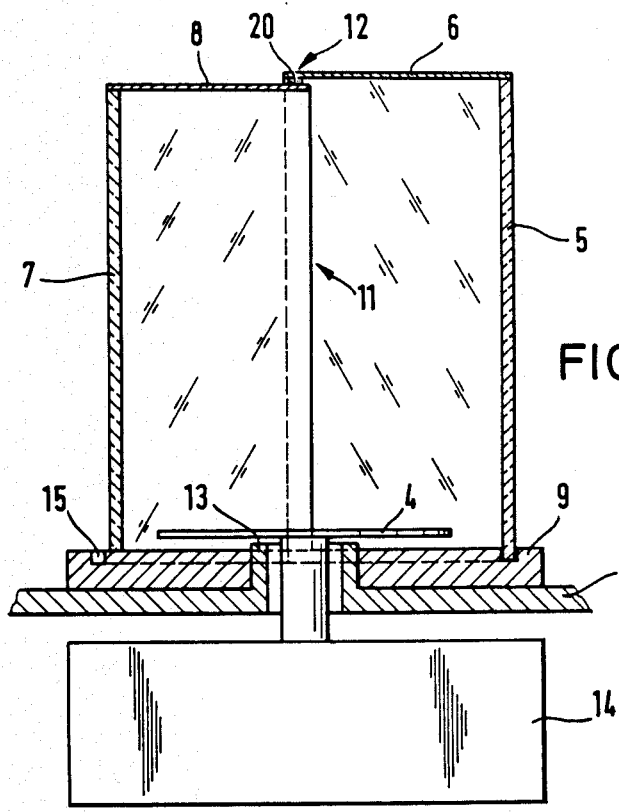
FIG. 2 shows a vertical section through the wind guard of FIG. 1.

The wind guard is shown again in FIG. 2 in vertical section. Only a part of the upper part of balance housing 1 is shown; likewise, the actual measuring system of the balance on which balance scale 4 is supported is indicated symbolically by 14, since it is unessential for the invention. FIG. 2 also shows wall element 5 with the associated covering segment 6, wall element 7 with the associated covering segment 8 and the overlapping area 12 of the two covering segments with seal 20.

In order to open the wind guard, element 5 is shiftably mounted in annular groove 15 in bottom part 9. The shifting is performed either manually (a grip on wall element 5 for simplifying is omitted in the figures for the sake of clarity) or by an electromotor (this electromotor is likewise omitted in the figures for the sake of clarity since it can be readily positioned by any one skilled in the art). The balance comprises two keys 16, 17 for operating a motor-driven opening and closing (FIG. 1). Wall element 7 is permanently positioned to bottom part 9 (e.g. adhered) and can be rotated together with bottom part 9; bead 13 in upper part 1 of the housing functions thereby as a centering and a guide. It is of course also possible to fasten bottom part 9 permanently to the upper part of the housing and to guide wall element 7 in a movable manner in a second groove in bottom part 9. The wind guard is normally opened and closed only by moving wall element 5, whereas shifting wall element 7 or rotating bottom part 9 only brings the loading opening into the position desired by the user.

Figure 3:
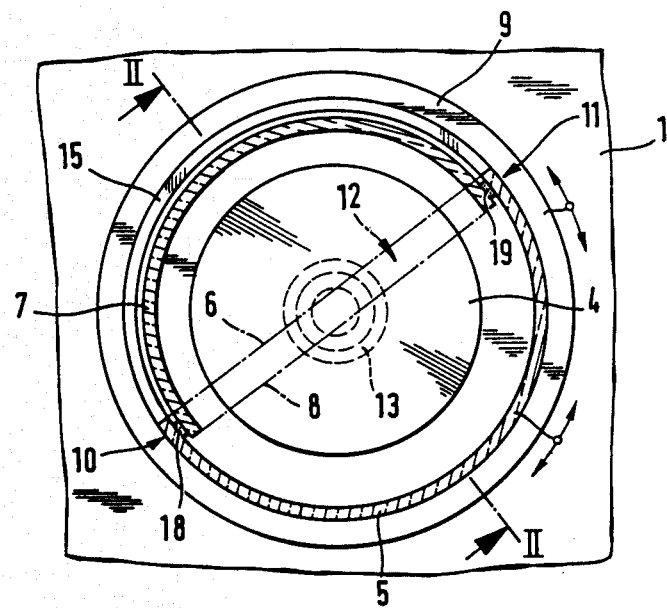
FIG. 3 shows a horizontal section through the wind guard of FIG. 1.

FIG. 3 shows the wind guard once again in a horizontal section. It shows front wall element 5 and back wall element 7, whereby seals 18, 19 which were omitted in FIG. 1 are also shown. Wall element 5 can move in groove 15 in bottom part 9. Balance scale 4 is shown in the center.

Wall elements 5, 7 with their associated covering segments 6, 8 can be manufactured e.g. from glass or metal. Both sliding doors can be manufactured from the same material or it is also possible to manufacture back wall element 7 with its associated covering segment 8 from metal and front wall element 5 with its associated covering segment 6 from glass. Or, the two covering segments 6, 8 can be manufactured from metal and the side parts 5, 7 of the wall elements can be manufactured from glass.

A second embodiment of the balance of the invention with wind guard is shown in a perspective view in FIG. 4 and in a horizontal section through the wind guard in FIG. 5. The parts which are the same as in the first embodiment in FIGS. 1 to 3 are designated by the same reference numbers. In the embodiment of FIGS. 4, 5 the wind guard consists of three cylindrically curved wall elements 21, 22, 23, each of which surrounds approximately one third of the cylinder circumference. Wall element 21 is connected to a corresponding part 24 of the covering surface, wall element 22 to corresponding part 25 of the covering surface and wall element 23 to corresponding part 26 of the covering surface. The seals between the individual wall and covering elements are once again not shown for the sake of clarity except for rather thick seal 27, which must bridge the total thickness of a wall element. Once again, each wall element can be shifted as in the first embodiment in an annular groove 28, 29 either manually or by means of a motor. Each wall element can be shifted individually or the two front wall elements 22, 23 can be coupled mechanically or be driven by the same electromotor so that they open and close synchronously.

This embodiment shown in FIGS. 4, 5 is distinguished by a particularly wide opening of the weighing area, since in the entirely opened state only somewhat more than one third of the cylinder circumference remains as wall.

A third embodiment of the balance of the invention with wind guard is shown in FIG. 6 in a perspective view and in FIG. 7 in a horizontal section through the wind guard. The parts which are the same as in the other embodiments are again designated with the same reference numerals. In the embodiment of FIGS. 6, 7 the wind guard consists of three cylindrically curved wall elements 31, 32, 33. The back wall element 31 is larger than the two front wall elements and surrounds somewhat more than one half of the cylinder circumference. The two front wall elements 32, 33 are smaller and surround only somewhat more than one fourth of the cylinder circumference. Once again, each wall element is connected to a corresponding part of the covering surface. Wall element 31 is connected to cover part 34, wall element 32 to cover part 35 and wall element 33 to cover part 36. The two front wall elements 32, 33 can move in the same annular groove 37 in bottom part 9, abut flush against each other in the middle and are sealed by seal 38 (in FIG. 7). The same applies to the two cover parts 35, 36, which are located at the same height. The motion of the two front wall elements 32, 33 can occur independently of one another or synchronously, i.e., by mechanical coupling or by means of the same electromotor. Likewise, all wall elements can be shifted in common in order to bring the opening of the weighing area into the desired direction.

This embodiment results in an opening of the weighing area which is just as large as in the first embodiment but which has the advantage that the angle of rotation about which each front wall element must be rotated is only half as large.

Of course, the two front wall elements 32, 33 can also exhibit a somewhat smaller radius of curvature in this embodiment than back wall element 31 does, so that they slide in front of back wall element 31 when the wind guard is opened. In this variation the space behind back wall element 31 can be closed off by a box and utilized for housing part of the electronic components.

As regards the selection of the material for the wall elements, that which was stated in the description of the first embodiment also applies here.

The transition between the wall element and the associated covering surface, which is shown to be angular in the figures (cf, e.g. FIG. 2) can of course also be rounded to a greater or lesser extent, whereby in the extreme case the form of the wind guard approaches that of a dome. Likewise, the covering surface naturally does not have to be flat and horizontal but can be inclined (falling off toward the cylinder circumference), so that the wind guard resembles a round tower with a sloping roof in the closed state. All these variants can be easily designed by any expert, so that they do not all have to be sketched and described in detail here.

What is claimed is:

1. Balance with a wind guard which comprises at least two cylindrically curves wall elements which can be shifted towards each other for opening and closing, the improvement wherein each wall element is connected to a corresponding top segment of a circular covering surface to allow loading from above when said wall elements are opened.

2. Balance with a wind guard according to claim 1, wherein the wind guard consists of two cylindrically curved wall elements, each of which surrounds somewhat more than one half of a cylinder circumference and that each wall element is connected to somewhat more than one half of the circular covering surface and both the wall surface and the covering surface slide past one another in a scissor-like manner.

3. Balance with a wind guard according to claim 1, wherein the wind guard consists of three cylindrically curved wall elements, each of which surrounds somewhat more than a third of a cylinder circumference, and that each wall element is connected to somewhat more than a third of the circular covering surface.

4. Balance with a wind guard according to claim 1, wherein the wind guard consists of three cylindrically curved wall elements, whereby one wall element surrounds somewhat more than one half of a cylinder circumference and each of the two other wall elements surrounds somewhat more than a fourth of a cylinder circumference and that the first wall element is connected to somewhat more than one half of the circular covering surface and each of the two other wall elements is connected to somewhat more than one fourth of the circular covering surface.

5. Balance with a wind guard according to one of claims 1 to 4, wherein the shifting of at least one of the wall elements (5, 7; 22, 23; 32, 33) is performed by an electromotor.

6. Balance with a wind guard according to one of claims 1 to 4, wherein in that all wall elements can be rotated in common manually.

7. Balance with a wind guard according to one of claims 1 to 4, wherein at least one of the wall elements consists of glass.

8. Balance with a wind guard according to one of claims 1 to 4, wherein at least one of the wall elements consists of metal.

* * * * *